313-135
3/30/82    XR    4,322,772

United States Patent [19]
Fry

[11] 4,322,772
[45] Mar. 30, 1982

[54] RAPID TRANSIT SYSTEM TRANSIENT VOLTAGE SUPPRESSION APPARATUS

[75] Inventor: Warren C. Fry, Connellsville, Pa.

[73] Assignee: Westinghouse Electric Corp., Pittsburgh, Pa.

[21] Appl. No.: 132,566

[22] Filed: Mar. 21, 1980

Related U.S. Application Data

[63] Continuation-in-part of Ser. No. 954,496, Oct. 25, 1978.

[51] Int. Cl.³ .............................................. H02H 7/10
[52] U.S. Cl. .................... 361/111; 361/100; 104/288; 318/135; 363/135
[58] Field of Search ............... 361/111, 110, 100, 33, 361/30; 323/81; 104/148 N; 318/135; 363/135, 138

[56] References Cited

U.S. PATENT DOCUMENTS

Re. 28,517  8/1975  Weiser ................................. 361/111

FOREIGN PATENT DOCUMENTS 836435  6/1960  United Kingdom .
1060172  3/1967  United Kingdom .
1174862  12/1969  United Kingdom .
1254711  11/1971  United Kingdom .
1342714  1/1974  United Kingdom .

OTHER PUBLICATIONS

J. E. Moxie and B. J. Krings, "Propulsion Control for Passenger Trains Provides High Speed Service," *Westinghouse Engineer*, Sep. 1970, pp. 143-149.

Primary Examiner—J. D. Miller
Assistant Examiner—L. C. Schroeder
Attorney, Agent, or Firm—R. G. Brodahl

[57] ABSTRACT

A transient voltage suppression apparatus is disclosed for application in conjunction with a power supply line to protect the chopper thyristor in the transit vehicle propulsion motor control apparatus, wherein an electrolytic capacitor is provided to absorb the inductive stored energy of that power supply line in the zener mode of operation of that capacitor upon the occurrence of a system fault condition involving that power supply line.

20 Claims, 13 Drawing Figures

RAPID TRANSIT SYSTEM TRANSIENT VOLTAGE SUPPRESSION APPARATUS

CROSS-REFERENCE TO RELATED APPLICATION

This is a continuation-in-part of Ser. No. 954,496, filed Oct. 25, 1978.

BACKGROUND OF THE INVENTION

It is known in the prior art to use an electrolytic capacitor with a power supply line to suppress transient energy voltages by storing the energy within the capacitor, with the standard practice being to limit the so applied voltage to the surge voltage rating of the capacitor as specified by the capacitor manufacturer.

It is also known to suppress transient energy voltages by the use of a copper oxide rectifier above its voltage blocking limit so that transient energy is conducted through the device in the reverse direction to dissipate the transient in the form of heat. The copper oxide rectifier uses an oxide layer, which conducts in one direction and blocks in the other direction up to the breakdown voltage capability of the oxide layer, whereon the oxide layer behaves like a zener diode and conducts current above that breakdown voltage.

It is known in the prior art to employ thyristor switch devices in a chopper apparatus to control the current supplied to transient vehicle propulsion motors, as described in an article entitled, "Alternative Systems For Rapid Transit Propulsion And Electrical Braking" that was published by B. J. Krings at pages 34 to 41 of the *Westinghouse Engineer* for March 1973.

SUMMARY OF THE INVENTION

The present invention relates to the provision of electrolytic capacitors in the filter capacitor apparatus associated with a power supply line for a transit vehicle propulsion motor current regulating thyristor chopper apparatus for providing transient voltage protection for that thyristor chopper apparatus. Each electrolytic capacitor is selected to have a predetermined zener breakdown voltage and arranged in a filter circuit such that it becomes operative in its zener breakdown mode to absorb energy for preventing the occurrence of a transient voltage on the power supply line that is greater than the known voltage rating of the protected thyristor device within the chopper apparatus associated with that filter circuit.

PREFERRED EMBODIMENT OF THE INVENTION

Figure 1:
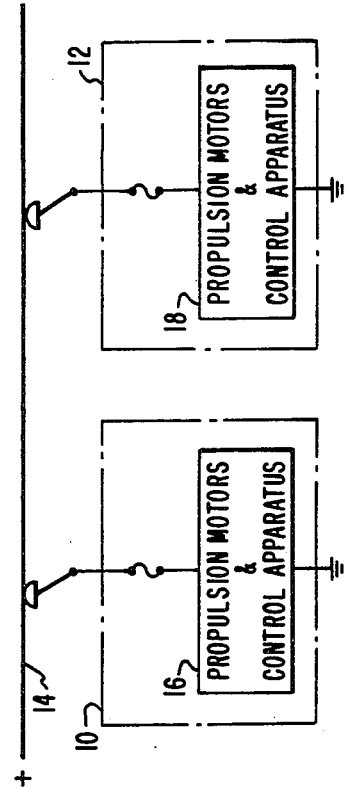
FIG. 1 shows two transit vehicles operated with the same third rail line of a power supply station.

In FIG. 1 there is shown the well known operation of two vehicles 10 and 12 of a rapid transit system, which vehicles are supplied direct current power from a common power supply source, such as third rail 14, that would occur when a first vehicle is followed by a second vehicle through the same power station. The first vehicle includes propulsion motors and motor current control apparatus 16 and the second vehicle includes propulsion motors and motor current control apparatus 18. If, for some reason, a ground fault, such as caused by a motor flashover or the like, should occur within a first one of those vehicles, a transient line current build-up in the order of 5,000 or more amperes could pass through the second vehicle due to the stored energy of the third rail inductance. The ground fault current would blow the line fuse of the first vehicle and the filter capacitor of the first vehicle would discharge stored energy back through the fault and into the supply line in the relationship of $\frac{1}{2} LI^2$, which fault energy could amount to 30,000 or more joules of stored energy. The filter capacitor bank of the second vehicle now has to absorb that stored transient energy if the chopper thyristors of the second vehicle are to be protected against a damaging too high applied voltage greater than the known maximum voltage rating of those thyristors.

The worst case situation for such a fault condition is shown in FIG. 1, where only one additional second vehicle is available to absorb all of the stored energy when a fault condition occurs on a first vehicle. If instead, several additional vehicles are operating with commonly supplied energy from the same power supply station when a fault condition occurs in one of the vehicles, there are then more additional vehicles available to absorb and share this provided sudden burst of transient energy.

Figure 2:
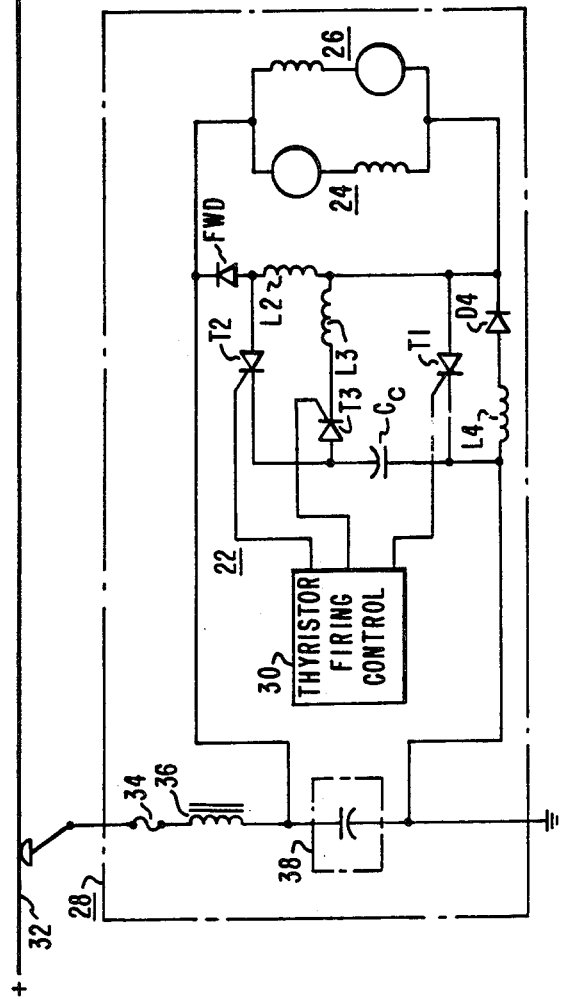
FIG. 2 schematically shows a motor current regulating chopper apparatus, such as used with transit vehicle propulsion motors.

In FIG. 2 there is shown a simplified and well-known propulsion motor current control chopper apparatus 22 connected in the motoring mode as described in the above published article. The chopper feeds two motor circuits 24 and 26 of a vehicle 28. A well known thyristor firing control 30 provides an OFF pulse to turn on the turn-off thyristor T2, such that the commutating capacitor $C_c$ charges to the same level as the line voltage. The commutating capacitor $C_c$ would charge to twice line voltage due to its combination with the smoothing reactor L2 if it were not for the free wheeling diode FWD. When the voltage on the commutating capacitor $C_c$ reaches line voltage level, the current through the capacitor $C_c$ and the thyristor T2 goes to zero and the thyristor T2 turns off. An ON pulse is now provided by the firing control 30 which turns on the turn-on thyristor T1 and the reversing loop thyristor T3. The load is thus connected directly to the supply voltage, causing the motor current to build up. Also, the voltage on the capacitor $C_c$ begins to decay as current flows through the thyristor T3, the reversing loop reactor L3 and the thyristor T1. The thyristor T3 turns off when this current has reached zero and the voltage on capacitor $C_c$ has reversed completely. Current now flows in the load only and the circuit is ready for turn-off. Turn-off is accomplished by the firing control 30 turning the thyristor T2 on. The load current now flows through the thyristor T2 and the capacitor $C_c$. After a short delay due to the reactor L2, the thyristor T1 turns off the diode D4 conducts, helping speed the charging of the capacitor $C_c$. The reactor L4 limits the rate of rise of current in the diode D4, and the diode D4 stops conducting before the capacitor $C_c$ charges to line voltage. When the capacitor $C_c$ has charged to line voltage, the free wheeling diode conducts current and the thyristor T2 turns off, leaving the circuit ready for another ON pulse and the start of another cycle. The current from the third rail 32 goes through the line fuse 34 and the line filter reactor 36 to the chopper apparatus 22. The line filter capacitor 38 is connected in parallel with the chopper apparatus 22.

Figure 3:
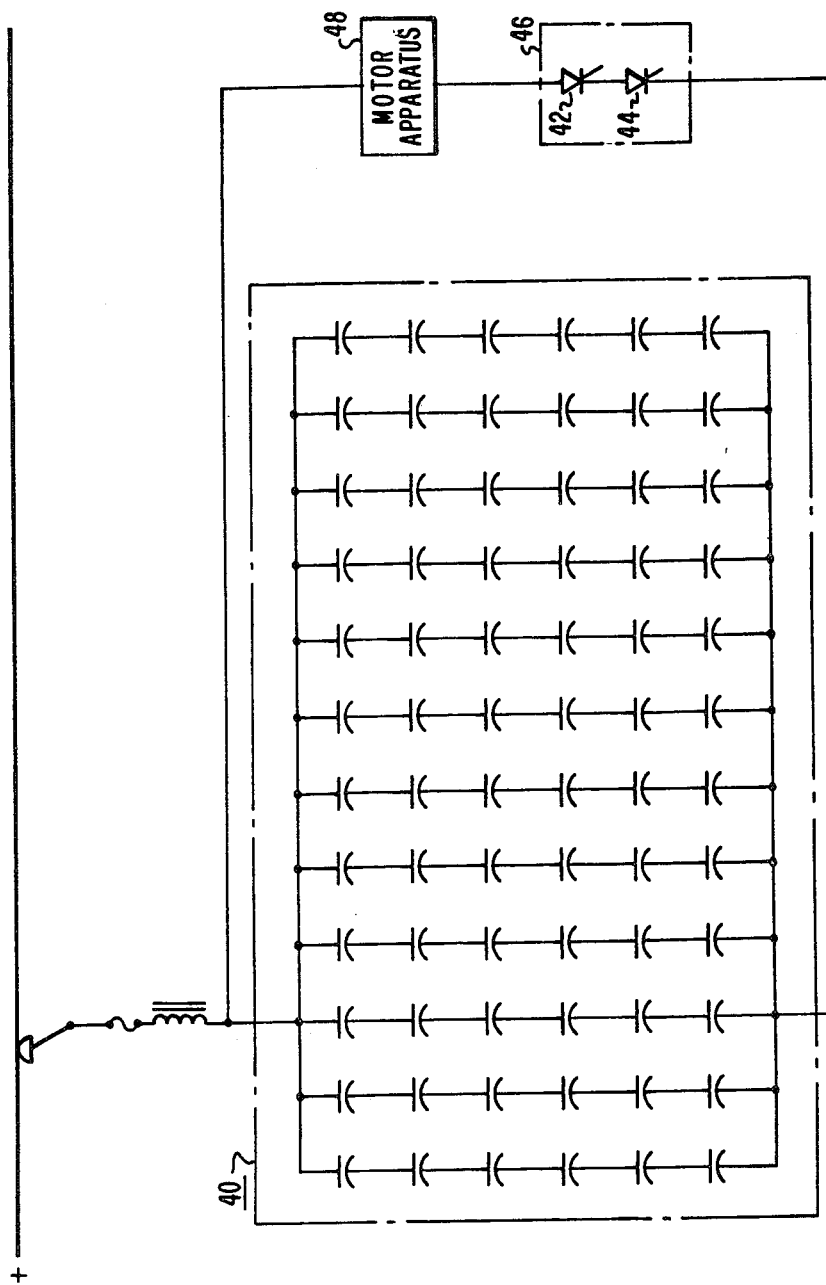
FIG. 3 illustrates a prior art line filter capacitor circuit arrangement operative with a two-thyristor chopper apparatus.

In FIG. 3 there is shown the line filter capacitor break circuit 40 used with a previously supplied chopper system for transit vehicles. The individual capacitors in the line filter capacitor bank are arranged in twelve parallel branches with six in series in each of the twelve parallel branches. The capacitors were selected to have a high enough surge voltage capability such that $\frac{1}{2} CV^2$ would equal the power supply line fault condition transient stored energy intended to be absorbed. The voltage surges are caused because for any large DC power supply system where there is a substantial line inductance, if a large load such as transit vehicle propulsion motors is turned off due to a fault condition, the resulting current can build up to in the order of 5,000 amperes or more in a particular power supply station section of track. A motor flashover on one vehicle can cause such a fault condition, which fault will blow the fuse or trip the line switch on the involved vehicle. With for example a current of 4,000 amperes coming down the supply line, which line may have 1.5 millihenry of inductance, the transient energy is $\frac{1}{2} LI^2$ or about 12,000 joules, and this energy is applied to the capacitor bank of the second vehicle. The capacitor bank shown in FIG. 3 was operative with a power supply line of 1,000 volts, and each capacitor was rated at 300 volts with a 350 volt surge rating and a zener breakdown of about 400 to 450 volts. Therefore, each serial branch of six capacitors would act as a capacitor up to about 2600 volts. The transient energy that could be absorbed as capacitors would be $\frac{1}{2} CV^2$, with C being 12,000 microfarad so at 2600 volts and acting as capacitors, they could absorb about 40,560 joules of energy. Since the transient energy provided in the above example is only about 12,000 joules, there is no problem concerning the two thyristors 42 and 44 provided in the current regulating chopper 46 operative with the propulsion motors 48 and which thyristors were 2400 volt rated. However, should the line inductance increase for some reason and should the fault current increase such that the voltage across the two series connected thyristors goes above 2400 volts, the capacitors would continue to act as capacitors until the thyristors failed due to an applied voltage above their rated voltage.

Figure 4:
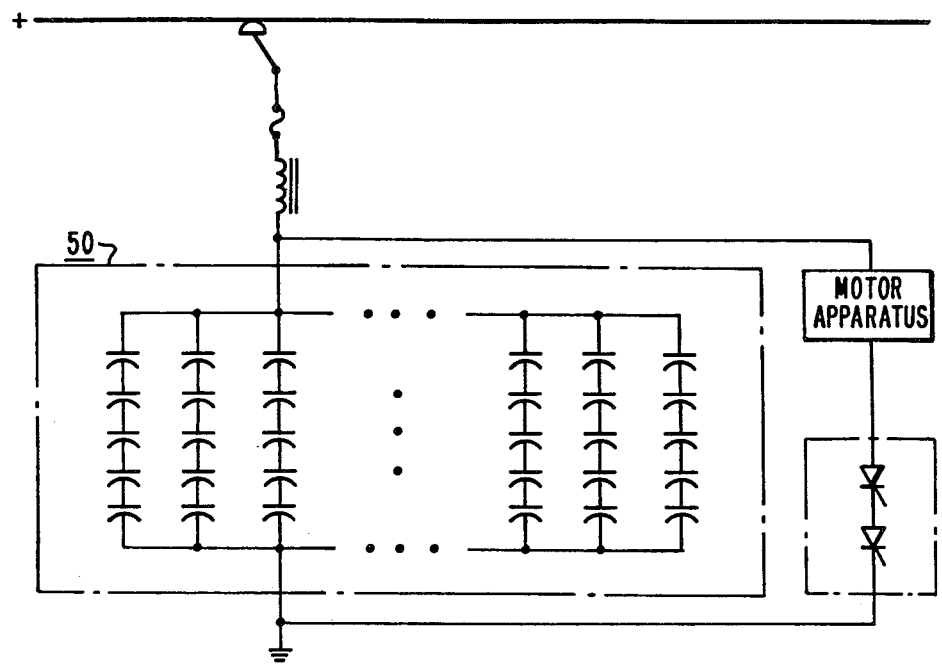
FIG. 4 illustrates another prior art line filter capacitor circuit arrangement operative with a two-thyristor chopper apparatus.

In FIG. 4 there is shown another line filter capacitor arrangement for a transit vehicle chopper system. The third rail voltage in this example was 750 volts, and each capacitor was rated at 250 volts, with each capacitor in the five capacitor series branch being applied at 750 divided by 1250 or 60% of its rated voltage.

In general, an electrolytic capacitor requires an adequate voltage stress normally applied to it to maintain the oxide layer thickness. Otherwise, a deforming of that layer can occur. For the 300 volts rated capacitors of the application illustrated in FIG. 3 with a line voltage of 1000 volts and six series connected capacitors in each branch, each capacitor had a normally applied voltage of 166 volts or about 55% of its rated voltage. For the 250 volts rated capacitors in the application illustrated in FIG. 4 with a line voltage of 750 volts and with five series connected capacitors in each branch, each capacitor had a normally applied voltage of about 150 volts or 60% of its rated voltage. One reason for selecting the arrangement shown in FIG. 4 was to increase the stress on each capacitor. Another reason was since the line filter capacitor bank is provided to minimize the chopped motor current from getting back into the power supply third rail line because it can interfere with the vehicle track signal currents in that line for wayside control and communication with the vehicles, by decreasing the number of capacitors to five in each branch of the filter, as shown in FIG. 4, this decreases the high frequency signal impedance of each branch by increasing the microfarads per branch; and this is effective to filter more of the chopped motor current away from the third rail power supply line.

Figure 5:
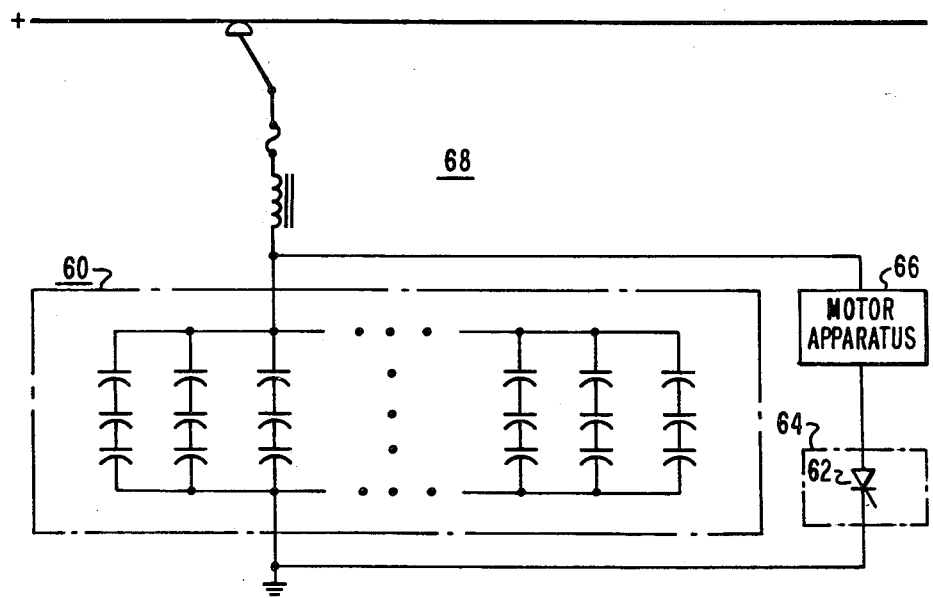
FIG. 5 illustrates the line filter capacitor circuit arrangement of the present invention which permits a single thyristor chopper apparatus.

In FIG. 5 there is shown the line filter capacitor arrangement 60 in accordance with the present invention for the example of the third rail power supply being 600 volts direct current and providing three series 300 volts rated capacitors in each parallel branch of the line filter capacitor to give a 900 volts rated capacitor branch. This would provide a voltage stress level of 66% of rated voltage on each capacitor in every branch. The zener breakdown conducting voltage characteristic of each capacitor is about 495 volts to give a transient stored energy voltage protection clamp per branch of just under 1500 volts. This now assures a known maximum line transient energy caused voltage that enables the selection of a single thyristor device 62 in the chopper apparatus 64 operative with the propulsion motors 66 of the vehicle 68, which thyristor device 62 can have a voltage rating above 1500 volts. The supply line transient energy caused voltage build-up is determined by the energy stored in the supply line inductance when a fault condition occurs and depends upon the fault current before it was interrupted. The arrangement of FIG. 5 employs the zener breakdown conductivity characteristic of each capacitor in a parallel branch to absorb transient stored energy and convert that energy into heat as a zener device. The 1500 transient energy caused voltage clamp provided by the capacitor arrangement of FIG. 5 permits using a single thyristor 62 having a voltage rating in the order of 1600 volts.

For a power supply line voltage of 750 volts and with three series connected 300 volts rated capacitors in each parallel branch of the line filter capacitor bank 60 this would provide a voltage stress per capacitor of 83% of rated voltage. It is generally recommended by the manufacturers of electrolytic capacitor cans of the type employed for filtering a transient propulsion motor chopper apparatus that a voltage stress between 60% and 80% of rated voltage is desirable to maintain and prevent deforming of the oxide layer. If it is desired to get this voltage stress to below 80% of the capacitor voltage rating, then three series connected 320 volts rated capacitors in each parallel branch would provide a voltage stress per capacitor of 78% of rated voltage. As compared to the 300 volts rated capacitors, the zener breakdown voltage of the latter 320 volts rated capacitors would increase some also; but the series branch would still be below the 1600 volts rating of the thyristor device to be protected. If desired, a single thyristor device can be presently obtained in the open market at a voltage rating up to about 2000 volts, so a thyristor device having an adequate voltage rating can be utilized with the three series connected 320 volts rated capacitors in each parallel branch of the line filter capacitor bank, such as shown in FIG. 5.

The present invention utilizes the electrolytic capacitors used in the line filter capacitor bank to provide transient stored energy caused voltage protection for the thyristor switch device or devices in the propulsion motor current chopper apparatus. Each capacitor, first as a capacitor and then as a zener device, can absorb a known wattseconds or joules of energy. If all the capacitors are arranged in a single series branch across the power supply line, then the same amount of wattseconds energy can be absorbed at a very high voltage. If all the capacitors are arranged in respective parallel branches, the same amount of wattseconds energy can be absorbed at a much lower voltage. By a suitable selection of capacitor voltage rating and a suitable circuit arrangement, for example as shown in FIG. 5, the required absorption of wattseconds energy is provided and a thyristor switch device selection is permitted having a lower voltage rating and having an improved transient energy caused voltage protection. In the present market, a lower voltage rating thyristor is less costly and the illustrated capacitor arrangement provides a known protection of the single thyristor device that provides greater reliability of operation, which is important to customers of this apparatus. The number of series connected capacitor cans in each parallel branch depends upon the known inductive stored energy characteristics of the third rail power line, which inductive stored energy does tend to decrease as the line voltage is reduced. The number of parallel branches depends upon the determined ripple current provided by the chopper when regulating the propulsion motor current during operation of the transient vehicle.

An additional consideration in relation to the selection of thyristor switches at the present time is that the 1000 volts family product in general has a voltage rating between 700 volts and 1400 volts and the top of the family at 1400 volts would provide a thyristor having fast turn-off, low forward drop and excellent characteristics for the application here intended. At the present time, the 2000 volts family product would be made by the high voltage process and the latter product has a slower turn-off and higher forward drop. The present invention enables using a single thyristor from the 1000 volts family product in the motor current regulating chopper for a typical transit vehicle propulsion motor chopper application, which is less expensive than two such devices and includes one less gating control and is better protected against stored energy transient voltages. In the zener mode of operation, a capacitor can in general absorb up to about ten times as much energy as it is able to absorb in the capacitor mode of operation.

The electrolytic capacitor is more attractive as a transient voltage suppression device for direct current service as compared to the copper oxide rectifier, since the capacitor can absorb and store energy as a capacitor before the capacitor then absorbs energy in the zener mode of operation similar to the copper oxide rectifier. Because the electrolytic capacitor has a large area of high purity aluminum and has a consistent thickness oxide, the direct current blocking level of the device to the clamping level is much lower than for the copper oxide rectifier; and this blocking to discharge ratio is in the order of 1.67:1 as compared with a ratio of 2.5:1 for the copper oxide rectifier. The capacitor has a large mass and large foil area to permit the capacitor to absorb very large amounts of energy, which in the case of a large electrolytic filter capacitor such as employed with transit vehicle propulsion motor control apparatus, is typically about 10,000 wattseconds for a single can as compared to 250 wattseconds for a large copper oxide rectifier, which latter rectifier costs several times more than the capacitor. Actual tests have been run to show that each capacitor, similar to those typically used in the main propulsion chopper filter for a transit car can absorb 600 amps per capacitor path and if twenty paths were used per car, then a single car could absorb a 12,000 ampere surge. If the zener clamping level were chosen to be 1800 volts, the energy capability would be 648,000 joules. This level of suppression capability is sufficient to limit all known stored energy transient voltages with a 750 volt DC third rail system to below 1800 volts.

One advantage of using the capacitor suppression as herein described is the resulting cost reduction and higher reliability that can be achieved in the chopper propulsion system by using a single thyristor device, as shown in FIG. 5 as compared with the practice of using two devices in series, as shown in FIGS. 3 and 4. The use of the capacitor as a suppression device in the zener mode can protect the thyristor semiconductors, which are used in conjunction with the capacitor arangement to have a higher voltage rating than the capacitor zener conducting voltage clamp; therefore, the capacitors can protect the thyristor semiconductor devices using zener discharge of the excess energy. It was the prior art practice for the capacitor surge voltage rating to be above the upper voltage rating of the thyristor semiconductor devices used; and the semiconductor devices would fail before a stored energy transient voltage was raised to the zener discharge level of the capacitors such that the zener mode of operation of the capacitors was not used.

Figure 6:
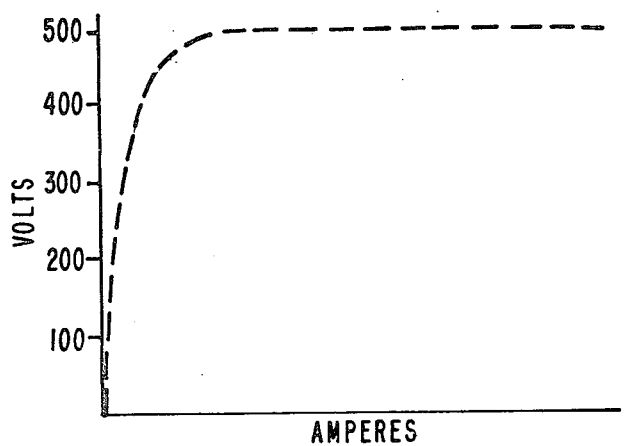
FIG. 6 illustrates the typical zener breakdown mode of operation of an electrolytic capacitor.

In FIG. 6 there is shown a voltage breakdown characteristic for a typical electrolytic capacitor wherein at 500 volts the oxide layer breaks down and a zener conductivity mode of operation takes place.

Figure 7:
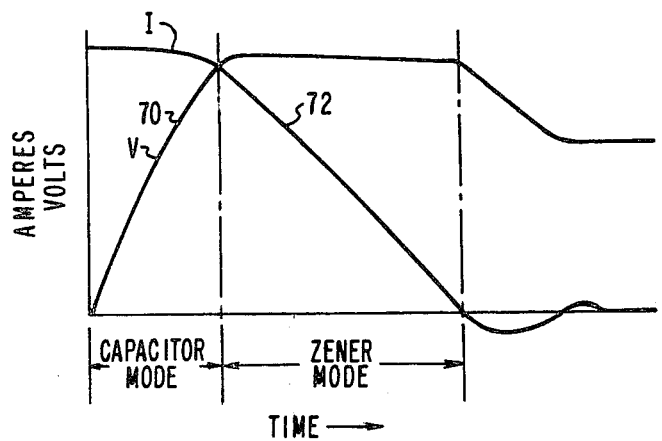
FIG. 7 illustrates the relationship of the inductive stored energy that is absorbed in the capacitor mode of the capacitor device and that is absorbed in the zener mode of the capacitor device.

The curve of FIG. 7 shows the capacitor mode of operation where the current is charging the capacitor, and after that the zener mode of the capacitor device becomes operative. The energy absorbed in each mode is the integral of the volts times the amperes for the respective mode time periods.

Figure 8:
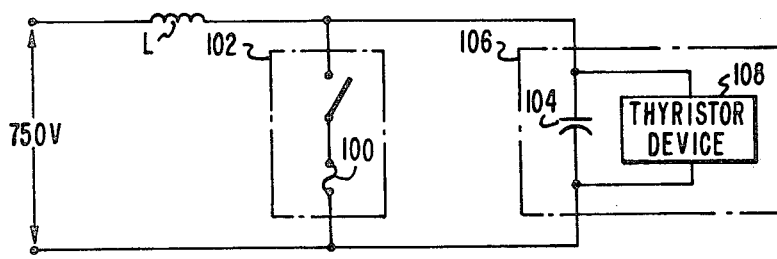
FIG. 8 illustrates the operation of the filter capacitor bank to protect the motor current control thyristor device in accordance with the present invention.

FIG. 8 shows an illustrative circuit apparatus to functionally illustrate the operation of the present invention.

The line inductance is shown to have a representative inductance of two millihenries. When the line fuse 100 of a first vehicle 102 is blown due to a ground fault condition or the like, this can result with a power supply voltage of 750 volts in a line current of about 5000 amperes or more being applied across the filter capacitor bank 104 of a second vehicle 106. The capacitor bank 104 has to absorb the resulting transient stored energy before the voltage across the capacitor 104 goes too high for the motor control thyristor device 108. The thyristor device 108 is connected in parallel with the capacitor 104, such as generally shown in FIG. 2. It is important that the voltage across the capacitor 104, such as shown by curve 70 in FIG. 7, not go too high for the thyristor device 108 used in conjunction with the capacitor 104. When the capacitor 104 is charging in the capacitor mode the voltage is rising across the capacitor 104 and across the thyristor device 108. Then when the zener breakdown conductivity voltage of the capacitor 104 is reached, this provides an upper limit on the voltage across the capacitor 104 and the thyristor device 108, such as shown by curve 70 of FIG. 7. The current then will ramp down to zero in a reverse di/dt relationship as shown by curve 72. The zener mode time period can typically cover a time period of several times the capacitor mode charging time period. Beyond the zener mode time period, the self-discharge of the capacitor will put current back into the line and the voltage across the capacitor will reduce to in the order of the supply source voltage, as shown in FIG. 7. The filter capacitor bank can be selected to provide all the stored transient energy absorption required to protect the associated thyristor devices, without going above the critical upper voltage rating of the thyristor devices.

Since an excessive core temperature can destroy an electrolytic capacitor, the high wattage energy of a transient fault current condition is absorbed in the dissipative mode using the temperature margin between the higher rated temperature of the capacitor and the lower actual normally operating temperature of the capacitor, and using that temperature margin to dissipate this energy in the known very short time period of the transient fault current condition.

The time duration of this energy dissipation should be kept sufficiently short for this fault current application such that the actual temperature stays below the rated 85° C. temperature anywhere in the capacitor.

Figure 9:
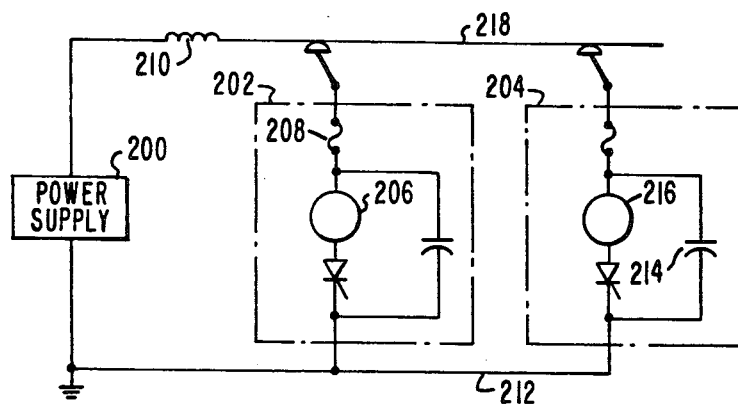
FIG. 9 illustrates the provision of a fault current condition which requires transient suppression.

A typical transient fault current condition occurs when an inductive load circuit is broken by a switch of some form, and the energy stored as $\frac{1}{2} LI^2$ wattseconds or joules in the inductor will drive the voltage to whatever voltage is necessary for the stored power to be dissipated in some circuit element, such as in an arc or in the filter capacitors. For a typical transit system fault current transient condition, as shown in FIG. 9, a power supply 200 operates with two cars 202 and 204 and one of the cars 202 has a flashover in the motor 206 or any other fault current condition cause, such as an insulation failure or a third rail system problem, which provides a very high fault current condition and burns out the fuse 208 of that car 202. The open fuse 208 then becomes a switch that opens the inductive load circuit. The motor flashover of motor 206, for example, was equivalent to closing a first switch and a high amperage fault current flowed to ground 212, which high amperage current flows through the line inductance 210. The fault current resulted from the voltage of the power supply 200, with the flashover motor 206 operating as a short circuit on the power supply 200. When this fault current is opened because the fuse 208 blows, then the stored energy $\frac{1}{2} LI^2$ due to the line inductance 210 has to be dissipated somewhere, such as in the arcing of the open fuse 208. This fuse 208 develops in the order of twice its rated voltage because it is arcing, but the adjacent vehicle 204 has a filter capacitor bank 214 in parallel with the fuse 208 and which is at zero volts so the fuse 208 blows open and then almost immediately the arcing stop to become an extremely poor absorber of energy because the capacitor filter bank 218 prevents the continuous arcing of the fuse 208 because of the low voltage on the capacitor bank 214. For an initial period of time the capacitor bank 214 operates as a storage capacitor to absorb the stored energy. The fault current is dumped to the adjacent vehicle 204 and its capacitor bank 214 which has to absorb the $\frac{1}{2} LI^2$ energy from the inductor 210. The capacitor bank 214 is typically placed aboard the vehicle 204 as determined by the ripple current RMS and signalling noise of the chopper system controlling the motor 216. The motor control chopper system applies a ripple current to the capacitor bank 214 and it is desired not to exceed the capacitor voltage rating and burn the capacitor 214 up, so a sufficient number of parallel paths of capacitors are provided to handle the anticipated ripple current and the anticipated signalling noise filtering requirements based on normal operation of the chopper system. The capacitor filter bank 214 prevents noise from getting back in the power line 218 and track rails from this chopper noise and gives the chopper a low impedance path to improve turn on and off.

Figure 10:
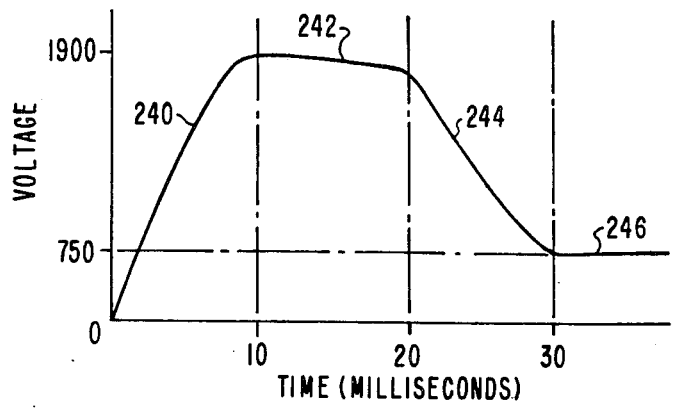
FIG. 10 illustrates the voltage and time characteristic of an electrolytic capacitor operation in the dissipative mode to suppress a transient fault current condition.

A line fault current transient that can be practically generated exceeds the storage capability of the capacitor filter bank 214 in the capacitor or storage mode, so the capacitor voltage can be pushed above the normal voltage rating where the capacitor bank 214 then goes to a dissipative high leakage or current conduction condition. In this dissipation mode of operation the volts times the amps is the power dissipation, and the capacitor 214 is dissipating the energy similar to a zener apparatus. As shown in FIG. 10, the voltage resulting from a line fault current and between conductors 212 and 218 climbs very rapidly in curve portion 240 due to the energy stored and then it will flat-top in curve portion 242 and come down rather linearly in curve portion 244 to line voltage 246. The curve portion 240 might last about 10 milliseconds, and the curve portion 242 in the dissipative mode might last for about 10 milliseconds and then the curve portion 244 might last for about 10 milliseconds.

Figure 11:
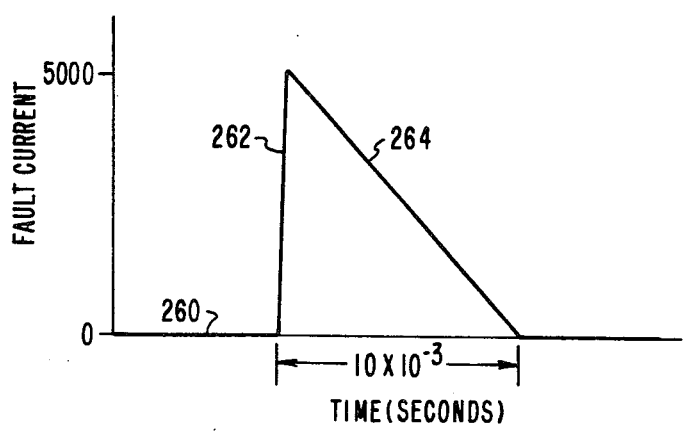
FIG. 11 illustrates the fault current flow through the capacitor filter bank.

As shown in FIG. 11, the capacitor filter bank fault current was zero at curve portion 260 because there was a short on the line. When the short is removed the fault current step functions up to some level such as 5000 amperes as shown by curve portion 262 and then immediately starts to decay as shown by curve portion 264 to substantially zero at the end of the dissipative mode. The voltage as shown by FIG. 10 is high on the capacitor bank in the order of 1900 volts for a 750 volts power supply and the capacitor bank has a lot of leakage in this dissipative mode, and then the voltage just decays off to line voltage of 750 volts as shown in FIG. 10.

Figure 12:
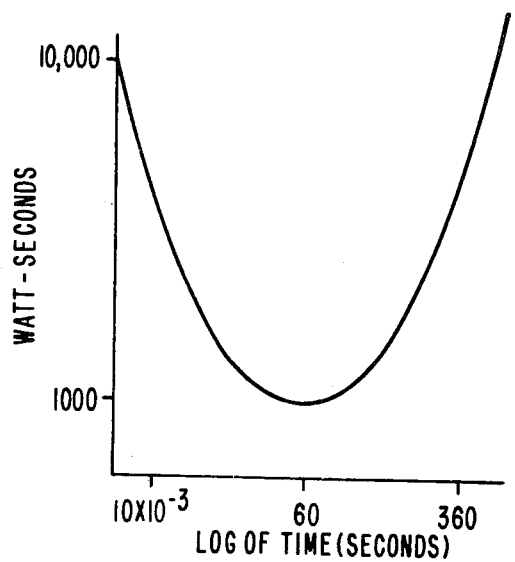
FIG. 12 illustrates the watt-seconds and time characteristic of an electrolytic capacitor.

In FIG. 12 there is illustrated an approximate wattseconds versus time characteristic of a large electrolytic capacitor. The electrolytic capacitor is in effect a large sheet of foil made of aluminum or suitable conductive material laid upon another large sheet of foil, and the dissipative or zener mode energy will tend to channel into localized areas of this capacitor because the present manufacturers forming voltage operation results in a capacitor that is not totally homogeneous so there are areas of localized very high power dissipation. Localized heating can result to destroy the capacitor because it is not homogeneous. This is similar in operation to having two capacitors in parallel that are not matched to be substantially similar, such that one will absorb all or most of the dissipative energy and become overheated and the other capacitor will absorb little or no dissipative energy, depending on how homogeneous each of the capacitors are. If 5000 wattseconds of energy is dissipated in one millisecond, a considerable power dissipation is required by each capacitor, but the wattseconds to be absorbed in a specific area in the one millisecond time period is far less than if the same wattseconds were applied for a one minute time period. Each area has resistance also which then causes larger areas to conduct as the time period is shortened, and in effect each capacitor becomes more homogeneous because each area of the capacitor is conducting but the period of time is short enough that the dissipated energy does not raise the localized temperature in any given area of the capacitor to the destruction point. The wattsecond characteristic curve shown in FIG. 12 illustrates that as the dissipative mode energy time duration increases, the wattseconds of energy that can be dissipated by the capacitor becomes lower. In the one minute region of the curve any significant leakage current will cause localized areas to overheat and destroy the capacitor because all of the watt-seconds of power is being dissipated in very localized areas of the capacitor and the ability to conduct the resulting heat away is poor. As the time is decreased to the millisecond region of the curve, the dissipative power handling wattsecond capability goes back up again because now the capacitor is absorbing the energy in a more homogeneous fashion over more of the total area of the capacitor.

In a time duration in the order of 10 to 20 milliseconds there is little practical difference between the localized heating in a single capacitor and the localized heating for two capacitors in parallel. A more homogeneous capacitor is required to permit the time duration of the dissipative power mode to increase substantially, since the more homogeneous capacitor is able to dissipate a given power level for a longer time period. For two capacitors in parallel, if the two capacitors are substantially matched, and have substantially the same wattsecond characteristics as shown in FIG. 12, they will approach more equal sharing of the dissipative energy, and if they are not so matched, they will not share the energy a well as required to avoid failure of one capacitor. Where the time duration of that energy is made very short in the order of a few milliseconds, the resistance drop of one capacitor can cause the other capacitor to share more equally a considerable part of the total dissipative energy.

A substantially matched resistance characteristic within each parallel capacitor of a filter bank operates to prevent the localized lower voltage regions from being destroyed and this same resistance characteristic causes a plurality of capacitor paths in parallel to share the dissipation for a few milliseconds of a high wattseconds of energy that occurs when a fault current condition exists, such as previously described in relation to FIG. 1.

It is difficult to match two parallel electrolytic capacitors for dissipative mode operation for a long-time operation, but the matching becomes practical for a short-time dissipative mode where the resistance characteristic as above described is a predominant consideration in relation to the total voltage.

Figure 13:
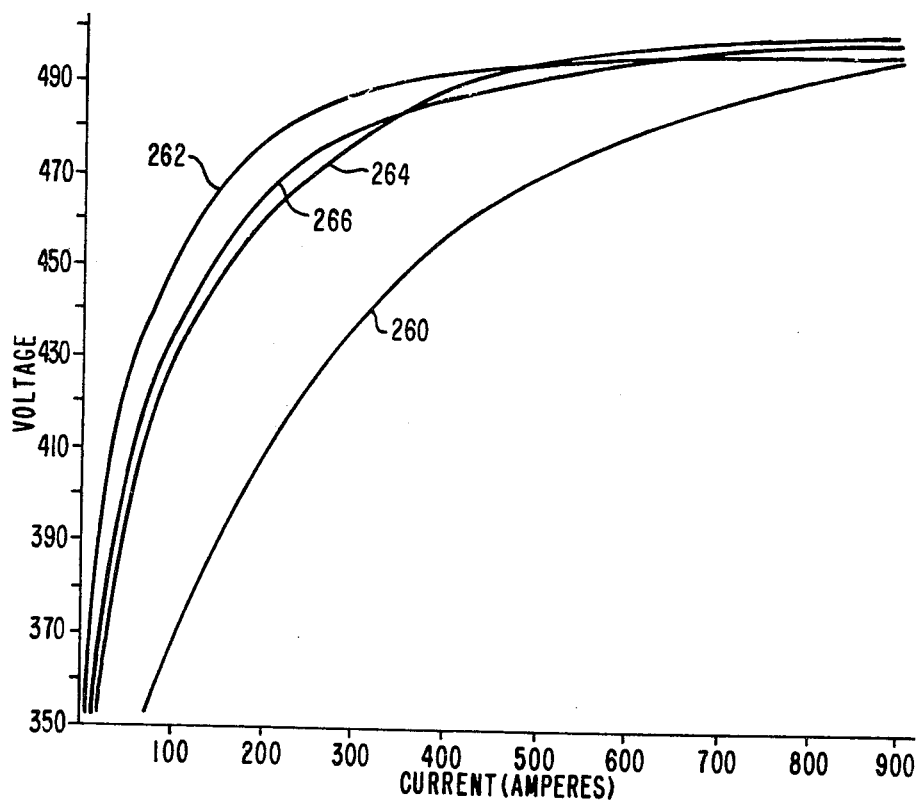
FIG. 13 illustrates the dissipative or zener mode operation of an electrolytic capacitor.

In FIG. 13 there is a curve illustrating the dissipative mode operation of a 6000 microfarad, 300 volt rated electrolytic capacitor. A soft knee curve 260 is shown and a harder knee curve 262 is shown. When the applied voltage reaches the knee of the curve, where the current leakage of the capacitor exceeds the leakage that the capacitor could service for a long term operation of several hours, the resistance characteristic becomes a significant influence in relation to current sharing leakage. The resulting voltage difference above rated voltage can be a considerable portion of the total voltage applied across the capacitor, and permits two parallel capacitors reasonably well matched and similarly rated to do sharing of dissipative energy mode for a time duration in the order of 20 to 30 milliseconds. If the parallel capacitors in a vehicle filter bank are within a few percent of each other in their forming voltage, for example within five percent, then the capacitors when in a sufficient number of parallel paths will adequately share the fault current in the dissipative mode for the previous example of FIG. 8. The forming voltage for an electrolytic capacitor is the voltage which determines the thickness of the oxide layer. During the manufacture of an electrolytic capacitor, a constant high current is passed through the capacitor and when the voltage at that current has come to a desired rating voltage level, the forming current flow is stopped. When a plurality of similar rated capacitors are made with the same forming voltage in this manner to achieve similar oxide layer thicknesses, they each have substantially the same leakage current characteristic at the same voltage. For a typical electrolytic capacitor, if the rated voltage is 300 volts, the forming voltage might be about 375 to 400 volts.

The prior art apparatus shown in FIGS. 3 and 4 employed off-the-shelf electrolytic capacitors that were not matched as above described. The current manufacturing process for electrolytic capacitors actually creates defects in the oxide layer of each capacitor by puncturing the layer to make electrical connections and by wrapping the foil which may cause cracks in the oxide layer, which defects are then subsequently healed in part by applying the forming voltage operation to the capacitor, with a constant current and bringing the voltage level up at constant current to the rated voltage of the capacitor. However, this forming or re-forming of the localized damage areas is not normally done to the same oxide thickness as the rest of the capacitor, and there are localized areas which are lower voltage than the bulk of the material. An extended normal service operation of the capacitor long enough at rated voltage will tend to heal the capacitor additionally and provide a more homogeneous device which can absorb a greater dissipative energy.

For a mass transit system here under consideration, a typical line current inductance L is about 1 millihenry, a typical fault current I can be from 3000 to about 10,000 amps for a line voltage of 750 volts. For the example of 10,000 amps flowing from a power supply of 750 volts and flowing into a capacitor bank which is in its dissipating mode, the voltage of that capacitor bank can rise to about 2000 volts. The differential voltage bringing the current to a halt is 1250 volts, so this would be 1250 amps per millisecond and for 10,000 amps and this provides a time duration for this transient of 8 milliseconds. So the time duration of the dissipative mode for this example would be about 8 to 10 milliseconds. With matched soft knee capacitors having the voltage-current characteristic curve 260 shown in FIG. 13, the energy level than can be absorbed in the dissipative mode has to be lower since the damaged areas of the capacitors cannot absorb as much fault current energy as compared to the hard knee capacitors having the characteristic curve 262. A soft knee capacitor has a greater localized heating problem in a given area and in addition that localized heating takes place at a lower voltage compared to the other regions of the capacitor so soft knee capacitors have to be dissipating the transient energy at a lower voltage for a given time duration than the hard knee capacitors.

Therefor, for a given fault current condition and a given power supply voltage, it requires more soft knee capacitors than hard knee capacitors, but fewer capacitors for this purpose are desired to reduce the cost of the filter capacitor bank. The number of capacitors needed for providing a low impedance source for the chopper and to isolate the chopper from the power supply line should also be operative to suppress the fault current transient.

To illustrate the selection of 6000 microfarad, 300 volt rated electrolytic capacitors for providing a practical embodiment of the present invention for the filter bank arrangement of FIG. 5, and assuming a power supply having a maximum rated voltage of 720 volts and a transient fault current to be suppressed of 5000 amperes as shown by FIG. 11, since it is desired to provide a voltage stress on each capacitor of about 60% to 80% of rated voltage, this would determine that three of the 300 volt rated capacitors be provided in series for each parallel branch path of the filter bank, since 720 divided by 900 provides an 80% voltage stress. It is now necessary to determine the number of parallel branches required to dissipate the 5000 amperes of transient current within 10 milliseconds, as shown by curve 264 of FIG. 11.

The first step is to individually apply to each capacitor in a group of capacitors to be tested, such as 60 capacitors that were made with similar forming voltages, a plurality of successive constant currents, for example 100, 200, 300, 400, 500 and 800 amperes, to determine where the voltage value across each tested capacitor becomes constant. In this manner a voltage versus current curve, such as curves 262, 264 and 266 shown in FIG. 13, is constructed for each tested capacitor. During this first step, it is desired to use well known and presently available automatic test equipment which senses when the actual voltage across the capacitor exceeds 125% of rated voltage, and then terminates the applied constant current through the capacitor within 10 milliseconds after that actual voltage is exceeded for preventing failure of the capacitor. In addition, the highest constant current should be first applied to each tested capacitor and then proceed successively to the next lower current and so forth until the lowest current is applied, with the testing conducted at a sufficiently slow repetitive rate to keep the actual temperature of the capacitor below a rated temperature of about 85° C.

The second step is to divide all of the tested capacitors into three voltage groups in relation to 800 amperes of current, with the first voltage group including tested capacitors with the highest one-third of the determined voltage values at 800 amperes, with the second voltage group including tested capacitors with the middle one-third of the determined voltage values at 800 amperes and with the third voltage group including tested capacitors with the lowest one-third of the determined voltage values at 800 amperes.

The third step is to establish each parallel branch path of the filter bank by selecting one tested capacitor from each of the above voltage groups to be included in that branch path. Now a voltage versus current curve is determined for each of these so selected branch paths by adding the respective determined voltage values of the series connected three selected capacitors included in that path for each of the first step currents of 100, 200, 300, 400, 500 and 800 amperes, to provided a path sum voltage value for 100 amperes, a path sum voltage value for 200 amperes and so forth up to 800 amperes.

The fourth step is to determine the number N of the now established branch paths that are required to dissipate the 5000 amperes of transient current. Since the branch paths are parallel connected in the filter bank, the branch path with the lowest sum voltage at 800 amperes will determine the maximum desired filter bank voltage and the maximum current that can be dissipated for each of the required N paths. Using the voltage versus current curve determined for each branch path, in relation to the maximum desired filter bank voltage, the maximum dissipative current can be determined for each branch path. These determined maximum dissipative currents for each of chosen branch paths are then added together until enough branch paths are chosen to be included in the filter bank to dissipate all of the 5000 ampere transient current.

I claim:

1. In transient suppression apparatus operative with a power supply providing current to a load and having inductive stored energy, the combination of thyristor switch means having a known voltage rating and connected to said power supply for regulating the current supplied to said load, capacitor means having a dissipative zener conducting voltage below the known voltage rating of said thyristor switch means and connected to said power supply for absorbing said inductive stored energy to provide a limit on the resulting voltage applied to the thyristor switch means, with said capacitor means comprising a filter bank including a plurality of parallel connected branches and with a plurality of electrolytic capacitors being series connected in each said branch, each said electrolytic capacitor being series connected in each said branch, each said electrolytic capacitor in every one of said branches having a rated voltage that has a predetermined relationship to the voltage of said power supply, and a plurality of electrolytic capacitors in each of said branches dissipating by zener conductivity a predetermined portion of said inductive stored energy to provide said limit.

2. The transient suppression apparatus of claim 1, with each electrolytic capacitor having an actual operating first temperature and a higher rated second temperature such that the temperature difference between the first and second temperatures determines the time duration of the dissipative zener conductivity that is provided for that electrolytic capacitor.

3. The transient suppression apparatus of claim 1, with the dissipative zener conductivity of each electrolytic capacitor being limited to a time period established in relation to the predetermined watt-seconds versus time characteristic of that capacitor.

4. The transient suppression apparatus of claim 1 operative with a fault current determined by said inductive stored energy,
with each electrolytic capacitor in said capacitor means having a voltage versus current dissipative zener conductivity characteristic that has a predetermined relationship with the voltage versus current dissipative zener conductivity characteristic of every other electrolytic capacitor in said capacitor means.

5. The transient suppression apparatus of claim 1, with said capacitor means including a plurality of electrolytic capacitors connected in a predetermined number of parallel branch paths and each said path sharing the absorption of said inductive stored energy as determined by the respective voltage versus current characteristics of said capacitors when operating in the dissipative zener conductivity mode.

6. The method of protecting a control apparatus including a semiconductor switch device having a rated voltage and in relation to a predetermined transient current condition from a power source connected to said control apparatus, including the steps of
providing capacitor means connected to said power source in parallel with the control apparatus, with said capacitor means including a plurality of parallel connected branches that each include an electrolytic capacitor having a predetermined dissipative zener conduction operation,
determining a voltage versus current characteristic for each electrolytic capacitor in said capacitor means for said dissipative zener conduction operation,
determining the transient current dissipation provided by each of said branches, and
determining the number of said branches required to provide zener conduction protection for said control apparatus such that the control apparatus is subjected to a maximum voltage below said rated voltage in relation to said predetermined transient current condition.

7. The method of protecting a control apparatus of claim 6,
with each parallel connected branch including a plurality of electrolytic capacitors.

8. The method of protecting a control apparatus of claim 6 operative with a power source having a known maximum rated voltage,
with each parallel connected branch including a plurality of electrolytic capacitors having similar zener conduction voltage ratings, and
determining the number of such capacitors in each said branch in relation to the maximum rated voltage of the power source.

9. The method of protecting a control apparatus of claim 6,
with said voltage versus current characteristic being determined for each electrolytic capacitor by sequentially applying a plurality of constant currents to that capacitor for determining respectively a corresponding plurality of voltage values for the capacitor.

10. The method of protecting a control apparatus of claim 6,
with each electrolytic capacitor of said capacitor means having a voltage versus current conduction characteristic with a predetermined relationship to the same characteristic for the other electrolytic capacitors of said capacitor means.

11. In transient voltage suppression apparatus operative with a power supply line supplying current to a load and having inductive stored energy, the combination of
thyristor switch means having a known voltage rating and connected to said power line for regulating the current supplied to said load, and
capacitor means connected to said line for absorbing said inductive stored energy to provide a desired limit on the resulting voltage applied to the thyristor switch means, with said capacitor means including at least one electrolytic capacitor and having a predetermined zener conducting voltage less than the known voltage rating of said thyristor switch means.

12. The transient voltage suppression apparatus of claim 11,
with the capacitor means being connected in parallel with said thyristor switch means.

13. The transient voltage suppression apparatus of claim 11,
with said capacitor means including a selected number of electrolytic capacitors connected in series as determined by the voltage of said power supply line to provide a predetermined voltage stress on each of said electrolytic capacitors.

14. The transient voltage suppression apparatus of claim 11,
with said capacitor means including a selected number of electrolytic capacitors connected in series as determined by the zener conducting voltage of each said capacitor in relation to the known voltage rating of said thyristor switch means.

15. The transient voltage suppression apparatus of claim 11,
with said thyristor switch means having a single thyristor switch device with a voltage rating greater than said desired limit on the resulting voltage applied to the thyristor switch means.

16. In voltage suppression apparatus operative with a power line having inductance, which power line supplies current to a first load subject to a fault condition wherein an inductive stored energy voltage buildup can occur in relation to that power line, the combination of
current control means connected to said power line and including thyristor switch means having a known voltage rating, and
capacitor means connected to said power line and across the current control means to absorb inductive stored energy from the power line upon the occurrence of said fault condition of the first load, with said capacitor means having a predetermined zener conducting voltage characteristic less than said known voltage rating to prevent the current control means from receiving a stored energy caused voltage build up greater than said known voltage rating.

17. The voltage suppression apparatus of claim 16, with the capacitor means including a predetermined number of series connected electrolytic capacitors as required to establish said zener conducting voltage characteristic less than said known voltage rating.

18. The voltage suppression apparatus of claim 16, with said thyristor switch means including a single thyristor switch device having a known voltage rating greater than said zener conducting voltage characteristic.

19. The method of protecting a current control apparatus including a thyristor switch device in relation to transient stored energy from a power source connected to said current control apparatus, including the steps of providing capacitor means connected to said power line in parallel with said current control apparatus, with said capacitor means having an electrolytic capacitor with a predetermined zener conduction voltage, and establishing the maximum voltage rating of said thyristor switch device to be greater than said predetermined zener conduction voltage of the electrolytic capacitor.

20. The method of claim 19, with said electrolytic capacitor being operative to absorb said stored energy in each of a capacitor mode of operation and a zener conduction mode of operation to limit the transient voltage buildup across the thyristor switch device.

* * * * *